(12) United States Patent
Schaffner

(10) Patent No.: US 7,691,297 B2
(45) Date of Patent: Apr. 6, 2010

(54) PROCESS FOR THE MANUFACTURE OF POWDEROUS PREPARATIONS OF FAT-SOLUBLE SUBSTANCES

(75) Inventor: David Schaffner, Rheinfelden (CH)

(73) Assignee: DSM IP Assets B.V., Heerlen (NL)

( * ) Notice: Subject to any disclaimer, the term of this patent is extended or adjusted under 35 U.S.C. 154(b) by 1216 days.

(21) Appl. No.: 10/541,359

(22) PCT Filed: Jan. 6, 2004

(86) PCT No.: PCT/EP2004/000028

§ 371 (c)(1),
(2), (4) Date: Jul. 6, 2005

(87) PCT Pub. No.: WO2004/062382

PCT Pub. Date: Jul. 29, 2004

(65) Prior Publication Data

US 2006/0115534 A1 Jun. 1, 2006

(30) Foreign Application Priority Data

Jan. 10, 2003 (EP) .................................. 03000365

(51) Int. Cl.
*A61K 9/14* (2006.01)
*A61K 31/12* (2006.01)
*A61K 31/015* (2006.01)

(52) U.S. Cl. ..................... 264/14; 425/6; 425/7; 425/8; 239/424; 239/432; 424/489; 514/690; 514/763; 264/5; 264/7; 264/13

(58) Field of Classification Search ..................... 425/6, 425/7, 8; 239/8, 424, 432; 264/7, 11–14
See application file for complete search history.

(56) References Cited

U.S. PATENT DOCUMENTS

| 4,519,961 A | 5/1985 | Schumacher et al. |
| 4,578,876 A | 4/1986 | Cartwright et al. |
| 5,487,916 A | 1/1996 | Christensen |
| 5,668,183 A | 9/1997 | Leuenberger |

FOREIGN PATENT DOCUMENTS

| EP | 0 749 769 | 12/1996 |
| FR | 2 243 727 | 4/1975 |
| WO | WO 91/17821 | 11/1991 |

OTHER PUBLICATIONS

International Search Report.

*Primary Examiner*—Christina Johnson
*Assistant Examiner*—Magali P Théodore
(74) *Attorney, Agent, or Firm*—Nixon & Vanderhye P.C.

(57) ABSTRACT

In a process for the manufacture of beadlet preparations of fat-soluble substances in a water-soluble or water-dispersible non-gelling matrix, an aqueous emulsion of the fat-soluble substance(s) and the matrix component are fed through a spray nozzle in the upper section of a vertical spray tower. Through separate inlets powderous starch and a stream of hot air are also fed in the upper section of the vertical spray tower. A stream of cold air is fed in the lower section of the spray tower so as to form a fluidised bed of starch-covered beadlets comprising the matrix component as well as the fat-soluble substances. The beadlets are collected from the fluidised bed and are discharged to a dryer.

7 Claims, 2 Drawing Sheets

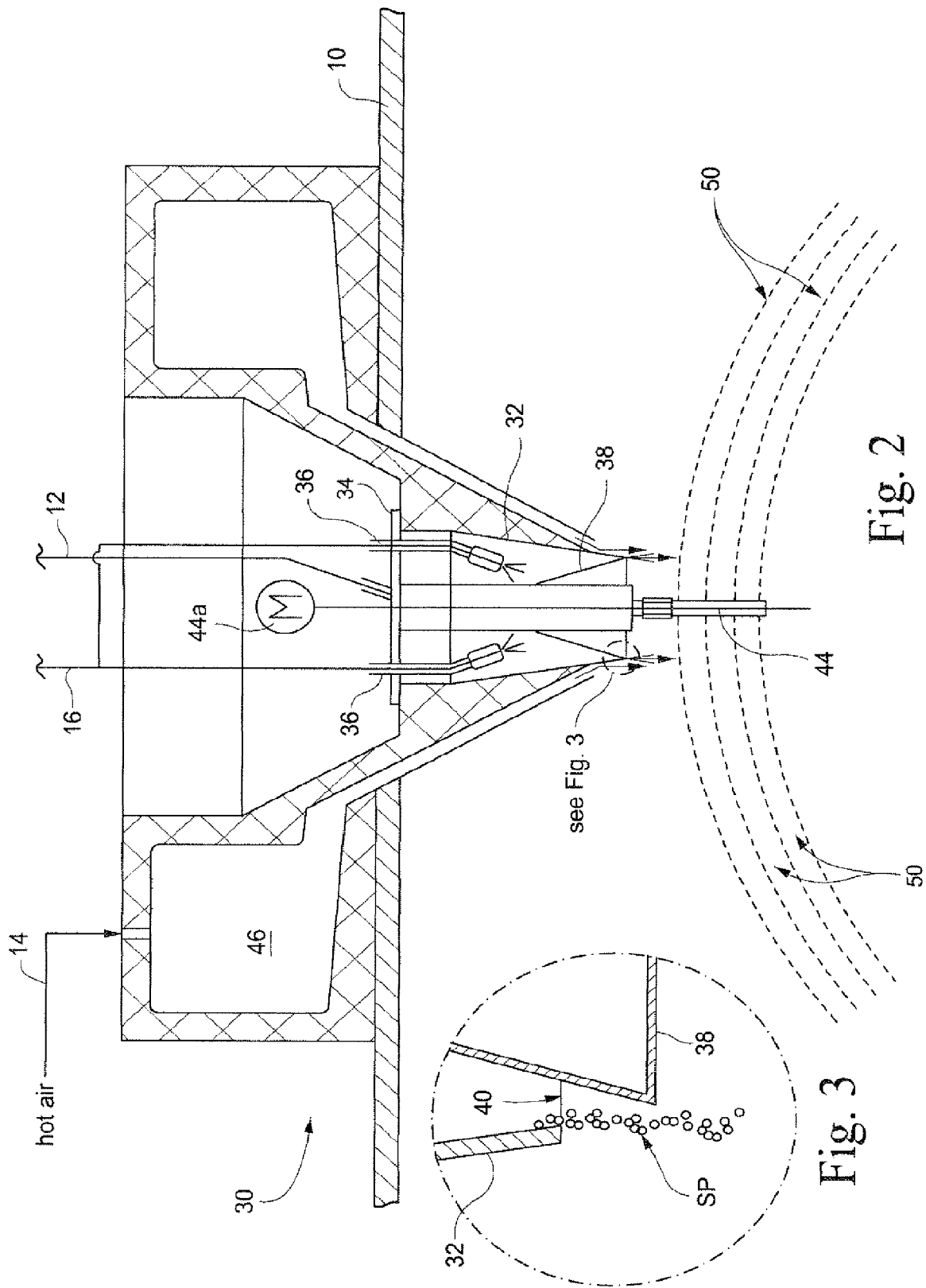

PROCESS FOR THE MANUFACTURE OF POWDEROUS PREPARATIONS OF FAT-SOLUBLE SUBSTANCES

This application is the US national phase of international application PCT/EP2004/000028 filed 6 Jan. 2004 which designated the U.S. and claims benefit of EP 03000365.1, dated 10 Jan. 2003, the entire content of which is hereby incorporated by reference.

FIELD

The present invention is concerned with a novel process for the manufacture of water-dispersible preparations of fat-soluble substances.

BACKGROUND AND SUMMARY

Water-dispersible preparations of fat-soluble substances, e.g. the fat-soluble vitamins, carotenoids, polyunsaturated fatty acids and the like, play an important role in the field of human and animal nutrition. Such preparations are usually marketed in the form of emulsions or dry powders because of their water-insolubility or also their more or less pronounced stability and ease of handling. It is a common feature of such preparations that the active substances, i.e. the fat-soluble substances, are usually enveloped with a matrix component (protective colloid), e.g. gum arabic or gelatine. This matrix component is responsible, inter alia, for the protection of the active substance or for its stabilization, for an optimum resorption and for the water-dispersibility of the final preparation which may be required. As the matrix component (protective colloid) there is normally used gelatine which originates from warm-blooded animals and which accordingly also has certain disadvantages. Merely by way of example there are to be mentioned here the fact that preparations based on such gelatine cannot be used worldwide for religious reasons, that without an expensive production process this gelatine and accordingly also the pulverous preparations manufactured therewith do not always have the desired dispersibility in cold water, etc. To overcome such drawbacks inherent to gelatine-base preparations the use of certain lignin derivatives as a matrix component instead of gelatine has been proposed, see, e.g., U.S. Pat. No. 5,668,183. A preferred process for the manufacture of such lignin derivative-based powderous preparations is the starch-catch process which is a spray-drying process where the sprayed emulsion particles are collected in a bed of starch. The so-obtained products consist of particles comprising the matrix component and the fat-soluble substance embedded therein which are covered by an adhesive layer of starch. The term "beadlets" as used herein refers to such particles.

Beadlets provide superiour handling properties in that they are not dusty and possess good flowablity characteristics. However, the production of lignin-derivative based beadlets and, generally, beadlets based on non-gelling matrix components, by the starch-catch process as described is accompanied by the formation of deposits in the spray tower which requires an interruption of the spray-drying process for cleaning the installation. It has now been found that the formation of deposit in the spray tower can be significantly suppressed or substantially avoided when a stream of cold air is introduced into the lower part of the spray tower, thus forming a fluidized bed which has a substantial lower temperature than the temperature of the spray zone, whereupon the beadlets are discharged from the fluidized bed to a dryer to complete the drying process.

Accordingly, in one aspect, the present invention relates to a process for the manufacture of beadlet preparations of fat-soluble substances in a water-soluble or water-dispersible non-gelling matrix, which process comprises (a) feeding in the upper section of a vertical spray tower, through a spray nozzle an aqueous emulsion of said fat-soluble substance(s) and said matrix component, and, through separate inlets, powderous starch and a stream of hot air, (b) feeding in the lower section of said spray tower a stream of cold air to form a fluidized bed of starch-covered beadlets comprising said matrix component said fat-soluble substances, and (c) collecting said beadlets from the fluidized bed and discharging them to a dryer.

In a further aspect, the present invention relates to an arrangement of nozzles substantially as shown in FIG. 2.

In still another aspect the present invention relates to an installation substantially as shown in FIG. 1.

BRIEF DESCRIPTION OF THE DRAWINGS

FIG. 2 is a cross-sectional view of an exemplary nozzle embodiment according to the invention; and FIG. 3 is an enlarged cross-sectional view of a portion of the nozzle depicted in FIG. 2.

DETAILED DESCRIPTION

Figure 1:
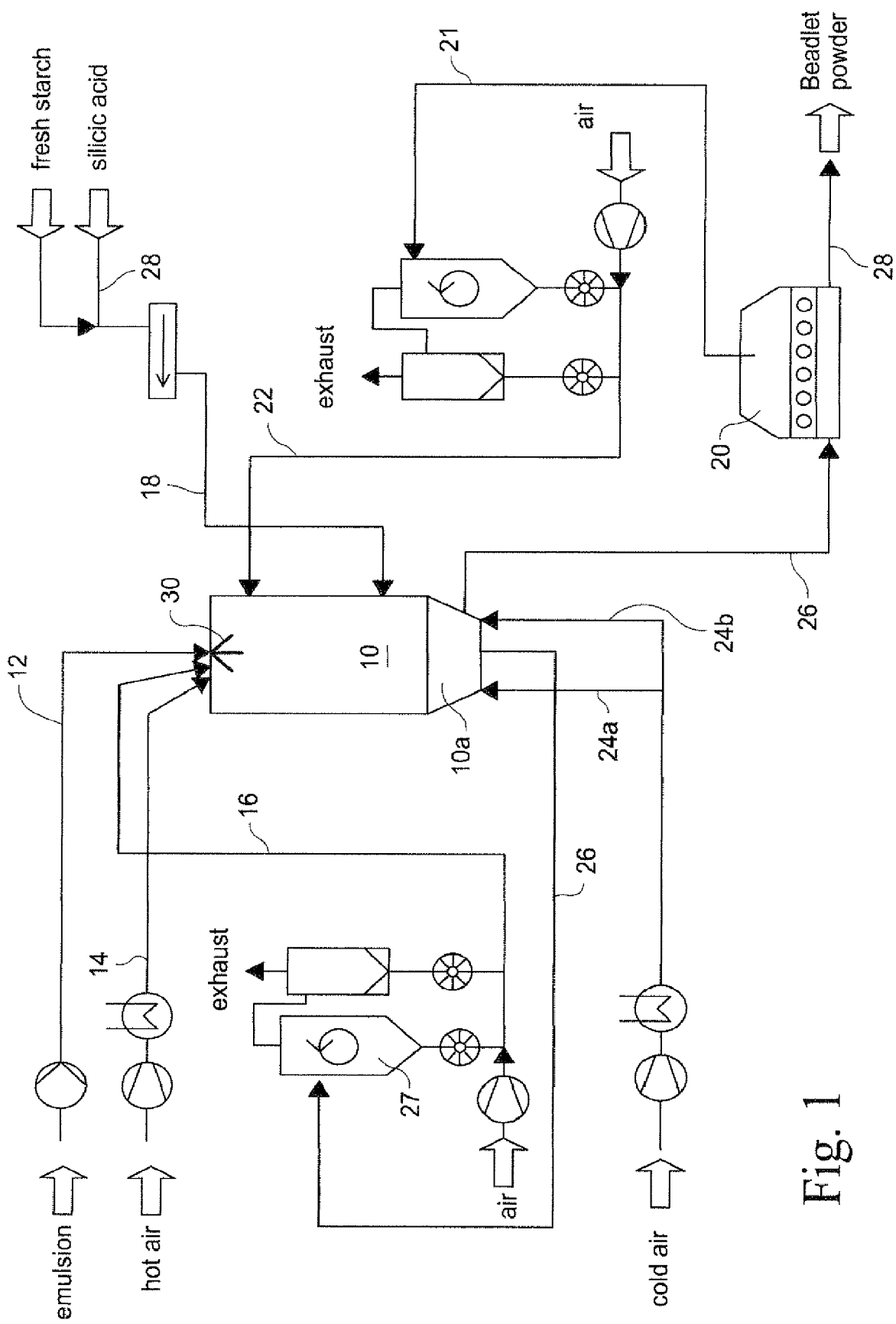
FIG. 1 is a diagram showing an embodiment of a process according to the invention.

FIG. 1 shows an installation which includes a spraying tower 10 for carrying out the process of the present invention. The spraying tower 10 can be any conventional spraying tower having at its top separate inlets for the emulsion flow line 12 which contains the fat-soluble substance, the matrix component and adjuvants, the fresh hot air flow line 14, and a hot air and starch recycle flow line 16. In the middle part of the spraying tower 10 inlets are provided for a fresh supply of starch via line 18 and for recycled air from the dryer system 20 via lines 21 and 22. At the bottom of the spraying tower 10, inlets are provided for cold air via lines 24a and 24b. An outlet line 26 is provided to allow air and starch to be discharged from the bottom of the spraying tower 10 and be recycled via line 16. The beadlets, i.e., the starch-covered particles comprising the matrix with the fat-soluble substance are collected at the bottom of the spraying tower 10 and are discharged though an outlet via line 26 to the dryer 20 for removal of residual humidity as required. A beadlet powder is discharged from the dryer 20 via line 28.

For improved fluidising the product in the internal fluidized bed of the spraying tower 10, silicic acid may be added to the fresh starch via line 28. The silicic acid is added via line 28 continuously to the starch flow via line 18 which is fed into the internal fluidized bed of the spraying tower 10 as required to compensate starch pick-up. Adjuvants may also be added at this location in the process.

In a preferred embodiment, the spray-drying process according to the present invention is carried out using an arrangement of nozzles 30 at the top of the spraying tower 10. An exemplary nozzle 30 is shown in accompanying FIGS. 2 and 3. As shown, the nozzle 30 comprises a first, hollow cone 32 having upper and wider end which is closed by a cover 34 having one or more inlets 36 for a starch/air dispersion supplied thereto via line 16. A second, inner cone 38 is fitted into the first, hollow outer cone 32 in such a manner that it points in upward direction into the first cone 32 thereby defining at its end a small circular slot 40 between the outer surface of the second cone 38 and the inner surface of the first cone 32 so that a dispersion of starch powder SP can pass therethrough and into the hot air discharged via channel 46a (see FIG. 3). An inlet tube 42 is provided coaxially with the cones 32, 38 to supply the emulsion via line 12. The inlet tube 42 protrudes in downward direction through the second cone and terminates with a rotary atomizer or pressure atomizer 44 rotated by means of motor 44a. The atomizer 44 distributes the emulsion, the air and starch stream as droplet streams 50 into the spray tower 10. The nozzle 30 further has a conventional, circular air inlet channel 46 surrounding the outer cone 32 having a discharge channel 46a ending slightly above the circular slot 40 that is formed by the cones 32, 38 to receive and distribute the hot air supplied via line 14. The nozzle 30 also has appropriate means, e.g. a thread (not shown), to tightly fix it in the spraying tower 10.

The dimensions of the nozzle 30 is not narrowly critical and depends on the requirements of the spraying capacity. The first, outer cone 32 may have a radius of about 30 to about 40 cm at its upper end and a height of about 40 to about 50 cm. The second, inner cone 38 may have a radius of about 20 to about 26 cm at its lower end and a height of about 15 to about 25 cm. The width of the slot 40 formed between the inner and outer cone is suitably about 3 to about 10 mm.

The inlet tube 42 for the supplying the emulsion suitably has a diameter of about 80 to about 110 mm and the rotary atomizer suitably have a diameter of about 32 to about 42 mm. The inlet tubes 36 for the supply of starch suitably have a diameter of about 3 to about 7 mm. The circular channel 46 for hot air supply suitably has a width of about 50 to about 70 cm.

The temperature of the emulsion is suitably in the range of 15° C. to 80° C. The ratio of hot air flow to cold air flow may be e.g., in the range of 1:8 to 1:4 (hot:cold). The hot air suitably has a temperature to provide a temperature in the spray zone of about 40° C. to about 200° C., preferably about 60° C. to about 120° C. Preferably, the hot air is dehumidified, e.g. to a water content of less than about 3 g/kg. For the fluidisation of the internal fluidized bed at the bottom of the tower cold and dry air (about 5-15° C.) with a water content of less than about 3 g/kg is suitably used. The temperature of the internal fluidized bed is maintained within the range of about 0° C. to about 40° C., preferably about 5° C. to about 20° C. by controlling the supply and temperature of the cold air.

The starch used in the process of the present invention is preferably corn starch. The term "fat-soluble substances" embraces in the scope of the present invention especially the fat-soluble vitamins A, D, E and K, carotenoids such as, for example, .beta.-carotene, astaxanthin, apocarotenal, canthaxanthin, apoester, citranaxanthin, zeaxanthin, lutein and lycopene. Examples for polyunsaturated fatty acids are e.g., linoleic acid, linolenic acid, arachidonic acid, docosahexaenic acid, eicosapentaenic acid and the like. However, there readily come into consideration other fat-soluble substances which play a role in human or animal nutrition. These substances, such as the previously mentioned, are usually marketed in the form of emulsions or dry powders because of their insolubility in water or also their more or less pronounced stability and ease of handling. Here there can be mentioned, in particular, oils and fats such as, for example, sunflower oil, palm oil and beef fat.

The matrix component in the emulsions that can be used in the process of the present invention is preferably a lignin derivative, especially a lignin derivative as described in U.S. Pat. No. 5,668,183 the contents of which are incorporated herein for reference purposes. Sodium, calcium and ammonium liginsulfonate are of particular interest. A mixture of several lignin derivatives can be used. Further examples of non-gelling matrix components for emulsions which can advantageously be processed into beadlet preparations (beadlets) in accordance with the present invention are modified starch, pectin and cellulose derivates. The emulsions which are processed in accordance with the present invention may further contain adjuvants conventionally used in such preparations, e.g. anti-oxidants such as butylated hydroxyanisole, butylated hydroxytoluene, ethoxyquin, tocopherols, or humectants such as glycerol, sorbitol, polyethylene glycol or propylene glycol.

The invention is illustrated further by the Example which follows:

EXAMPLE

An emulsion comprising 3 wt % of active component, e.g., d,l-α-tocopherol acetate, 43 wt % of water, 50 wt % of lignin sulfonate and 4 wt % of additives is prepared and processed in an installation as shown in FIG. 1. In the following the reference numerals refer to the respective reference numerals in FIGS. 1-3.

Corn starch is introduced into the spraying tower 10 through line 18. Subsequently, a flow of the emulsion via line 12 is sprayed into the spraying tower 10 through an arrangement of nozzles 30 as shown in FIG. 2. At the top of the tower 10 hot air at 80° C. with a water content of 8 g/kg is fed in via line 14.

For the fluidization of the internal fluidized bed at the bottom of the tower 10, cold dried air at 10° C. with a water content of 1 g/kg is fed in via lines 24*a* and 24*b*.

Fresh cornstarch is added via line 18 as required to compensate for starch pick-up by the beadlet formation. For fluidizing of the beadlet product in the internal fluidized bed silicic acid may be added continuously to the starch flow via line 28.

The fresh cornstarch as well as the silicic acid is fed directly in the internal fluidized bed.

Exhaust air leaves the tower 10 through a cylinder (not shown) in the middle of the conical bottom 10*a* of the tower 10. The cornstarch in this air is separated by a cyclone 27 and recycled to the tower 10 (directly in the atomizing zone) via line 16. The temperature of this air is about 60° C., and the water content 12 g/kg. The recycled cornstarch via line 16 is atomized by two nozzles 36 in the outer cone 32 of the nozzle 30. The finely distributed cornstarch falls down on the outer cone 32 and the inner cone 38 and trickles afterwards through the circular slot 40 that is formed by the two cones 32, 38 in the tower 10.

The particles (beadlets) leaving the spraying tower 10 and containing some moisture are moved to an external dryer 20 which is operated using dehumidified air. The beadlets leaving the external dryer 20 via line 28 have an average diameter of about 150-500 μm.

The invention claimed is:

1. A process for the manufacture of beadlet preparations of fat-soluble substances in a water-soluble or water-dispersible non-gelling matrix component, which process comprises:

(a) providing a spray zone comprised of at least one nozzle in a vertical spray tower which comprises:

(i) a first hollow cone having an upper and wider end which is closed and which carries one or more inlets for a starch/air dispersion;

(ii) a second inner cone fitted into the first hollow outer cone in such a manner that it points in an upward direction into the first cone thereby defining a small circular slot between an outer surface of the second cone and an inner surface of the first cone;

(iii) an inlet tube having a closed end and a rotary atomizer protruding in a downward direction through the second cone and having at a terminal end thereof an atomizer; and (iv) a circular air inlet channel surrounding the first cone and having a discharge channel which terminates above the circular slot that is formed between the first and second cones;

(b) feeding an aqueous emulsion of fat-soluble substance (s) and a matrix component to the atomizer of the nozzle so that particles of the aqueous emulsion are discharged from the atomizer in the spray zone and into the spray tower, (c) feeding a starch powder to the nozzle into a space between the first and second cones such that the starch powder is discharged through the circular slot and contacts the particles of the emulsion discharged by the atomizer in the spray zone, wherein the particles are coated with an adhesive layer of the starch powder and treated with the hot air discharged from the hot air discharge channel surrounding the first cone;

(d) feeding to a lower section of the spray tower a stream of cold air to form a fluidized bed of starch-covered beadlets comprising the fat-soluble substance(s) and matrix component; and (d) collecting the beadlets from the fluidized bed and discharging the beadlets from the spray tower to a dryer.

2. A process as in claim 1 wherein the spray zone has a temperature of about 40° C. to about 200° C. and the fluidized bed has a temperature of about 0° C. to about 40° C.

3. A process as in claim 1 wherein the matrix component is a lignin derivative.

4. A process as in claim 3 wherein the lignin derivative is a lignin sulfonate.

5. A process as in claim 1 wherein the fat-soluble substance is vitamin A, D, E and K, a carotenoid, a polyunsaturated fatty acid, an oil or a fat.

6. A process as in claim 1 wherein the fat-soluble substance is β-carotene, astaxanthin, apocarotenal, canthaxanthin, apoester, citranaxanthin or zeaxanthin.

7. A process as in claim 2, wherein the spray zone temperature is about 60° C. to about 120° C. and the fluidized bed temperature is about 5 to about 20° C.

* * * * *